Jan. 10, 1933.  J. E. MARSDEN  1,893,628
MIXING BOWL
Filed Feb. 21, 1930
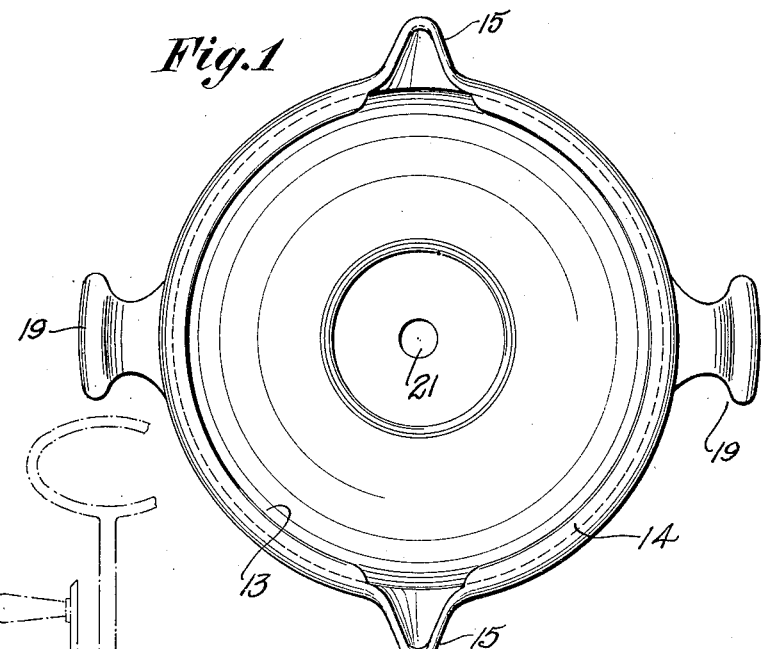
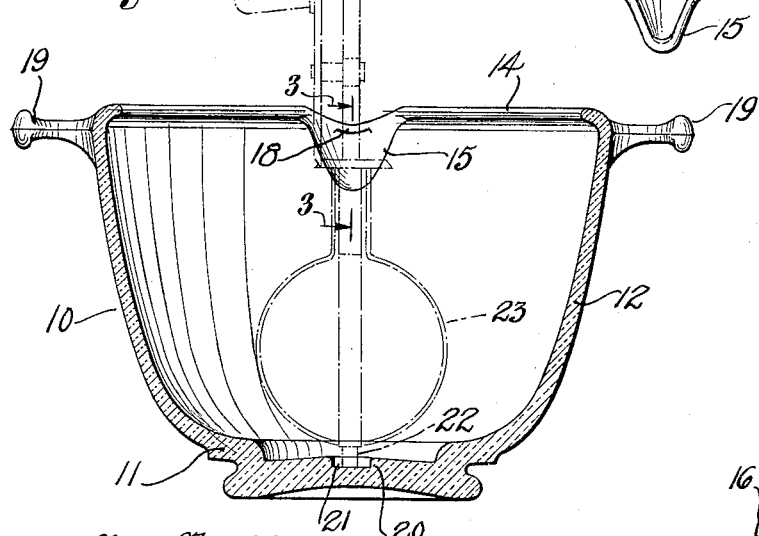
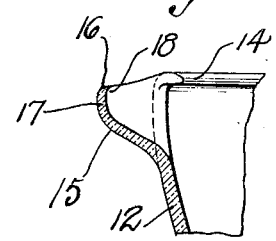
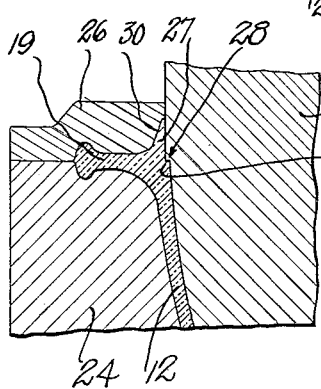
INVENTOR
John E. Marsden
BY Louis Shumacher
ATTORNEY Patented Jan. 10, 1933

1,893,628

UNITED STATES PATENT OFFICE

JOHN E. MARSDEN, OF PHILADELPHIA, PENNSYLVANIA

MIXING BOWL

Application filed February 21, 1930. Serial No. 430,165.

This invention relates to mixing bowls, and methods of making the same.

One object of the invention is to provide a device of the character described, including a mixing bowl having an improved inturned rim and other co-operating means facilitating the use of the bowl and preventing the contents thereof from overflowing due to centrifugal force generated by the mixing.

Another object of the invention is to provide a device of the type mentioned which is simple and inexpensive in construction, convenient, reliable, and efficient in use.

Another object of the invention is to provide an improved process for making a mixing bowl, or other glassware.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a top plan view of a mixing bowl embodying the invention.

Fig. 2 is a vertical sectional view thereof showing a mixing device.

Fig. 3 is a fragmentary sectional detail view of a spout portion of the mixing bowl taken on line 3—3 of Fig. 2.

Fig. 4 is a fragmentary sectional view of a mold and the mixing bowl cast therein.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Generally described, this invention provides a mixing bowl which can be used for many purposes, as, for instance to mix batter, or the like, and can be made of many different materials, of which glass is one. This mixing bowl may be rested in the lap of the user, held by one hand, while the other hand operates any suitable stirrer, or a mechanical mixer. To prevent overflow of the bowl contents, the rim portion of the bowl is inwardly turned or flanged. For pouring the bowl contents, the bowl may have a spout from the flange thereof. The spout may be lower than the rim to avoid hindrance to the operation of a spoon or other stirrer, and the spout may have a substantially vertical wall portion to aid in the retention of the bowl contents. A mechanical mixer may be combined with the mixing bowl, through a guide or bearing portion in the bottom thereof to centrally hold the mixer.

By my improved process, any glassware, as, for example, the bowl in question, may be cast with a weakened rim portion. The latter may also be tapered if desired. On being removed from the mold, the glassware is reheated and the rim portion inturned by the application of pressure thereto.

Referring in detail to the drawing, 10 denotes an article of glassware, such as a mixing bowl, embodying the invention. The same includes a bottom 11 and a circular side wall 12 having a relatively large top opening 13. The rim portion of the bowl is inturned to provide a lip or flange 14 lying in a substantially horizontal plane. This flange extends inward of the wall 12 to retain the contents of the bowl and prevent overflow thereof when the same is subjected to a rapid centrifugal force in the mixing action. As the flange 14 is relatively narrow, the opening 13 remains large and unobstructed.

For pouring the contents of the bowl, the same has one or more spouts 15 extending from the flange 14 and wall 12. The rim 16 of the spout is below the flange 14 to prevent interference with a stirrer for the bowl contents. To aid in the retention of the said contents, the spout has a relatively vertical outer wall portion 17, but the same may also be inturned at its rim at 18 by subsequent reheating and pressure or any other desired manner.

Disposed adjacent to the rim portion of the mixing bowl are one or more handles 19 whereby the bowl may be easily and conveniently held.

In the bottom 11 of the mixing bowl is a guide portion 20, which may have a recess 21 to receive any projecting axial portion 22 of a rotary mechanical mixer 23. The latter may be of any conventional construction.

In manufacturing the mixing bowl, the molten glass may be placed in any suitable mold having a central head or plunger 25, and a ring 26 overlying the mold and in contact with the plunger. The mold parts coact to provide a thin, weakened, or tapered rim portion 27 in the bowl as initially cast. For instance, the plunger may have an undercut 28 to weaken the rim portion of the bowl or provide a line of demarcation 29. The rim portion may be tapered as shown at 30.

Now on removing from the mold the bowl as cast, the same may be reheated, and pressure applied to the rim portion 27 to construct the lip or flange 14. The tapered form of the rim assures an easy flow of the glass, and the weakened line 29, limits and assures a uniform contour in the flange 14. The pressure may be applied in any feasible manner or by any desired tool as will be readily understood in the art. An even pressure may be obtained by spinning the bowl as the pressure is applied.

Various changes and modifications may be made in the invention or in the process herein described, the same being submitted in an illustrative not in a limiting sense.

I claim:

1. A one-piece mixing bowl having circular side wall providing a horizontal rim, said bowl having an integral inturned flange at the rim to retain the bowl contents in centrifugal mixing action, said flange being relatively narrow to provide a large mouth for the bowl, and an outward extending spout for the bowl below the level of the flange, said spout having an inwardly extending rim portion to retain the contents of the bowl in centrifugal mixing action.

2. A one-piece mixing bowl having circular side wall providing a horizontal rim, said bowl having an integral inturned flange at the rim to retain the bowl contents in centrifugal mixing action, said flange being relatively narrow to provide a large mouth for the bowl, and an outward extending spout for the bowl, said spout having a substantially vertical wall portion at the tip of the spout for retaining the bowl contents as stated, the upper edge of the said tip being approximately at the level of the flange, and the bowl having a plurality of oppositely alined outwardly extending handles connected to the wall and flange thereof.

3. A one-piece mixing bowl having a downwardly tapered circular side wall providing a horizontal rim, said bowl having an integral inturned flange at the rim to retain the bowl contents in centrifugal mixing action, said flange being relatively narrow to provide a large mouth for the bowl, and a spout for the bowl, extending outward therefrom, said spout being outwardly concaved and having an upright upper portion having an inturned lip at the edge thereof for retention of liquid under centrifugal action in the bowl.

4. A one-piece mixing bowl having a diameter greater than the depth thereof, and having circular side wall providing a horizontal rim, said bowl having an integral inturned flange at the rim to retain the bowl contents in centrifugal mixing action, said flange being relatively narrow to provide a large mouth for the bowl, an outward extending spout for the bowl, the upper edge of which is approximately at the level of the flange, said bowl having an outside handle connected to the wall of the flange and extending in an approximately horizontal direction.

5. A one-piece mixing bowl having circular side wall providing a horizontal rim, said bowl having an integral inturned flange to retain the bowl contents in centrifugal mixing action, said flange being relatively narrow to provide a large mouth for the bowl, and a spout for the bowl, extending outward from said flange, the upper end of said spout being substantially at the level of the flange, said spout having a substantially vertical wall portion at the tip of the spout for retaining the bowl contents as stated, said vertical wall portion having an inturned lip at the free edge thereof.

6. A portable shallow mixing bowl having a downward tapering wall and a pair of opposite alined laterally projecting knob handles adjacent to the upper edge thereof for affording a supporting axis above the center of gravity of the bowl and about which the bowl may be swung, said bowl having a spout extending outward of the wall of the bowl at said upper edge and substantially radially at right angles to said axis, said bowl having a relatively narrow inturned flange extending along the upper edge thereof to retain the contents of the bowl in centrifugal mixing action.

In testimony whereof I affix my signature.

JOHN E. MARSDEN.